United States Patent [19]

Wang

[11] Patent Number: 4,784,362
[45] Date of Patent: Nov. 15, 1988

[54] HYDRAULIC AUTOMATICALLY ASCENDING APPARATUS WITH A VOLUME-VARIABLE OIL TANK

[76] Inventor: John Wang, No. 129, Tuan-Chu Lane, Tuan-Chu Li, Chiayi City, Taiwan

[21] Appl. No.: 99,230

[22] Filed: Sep. 21, 1987

[51] Int. Cl.$^4$ .................... F16F 9/08; F16M 13/00
[52] U.S. Cl. .................... 248/562; 248/188.3; 188/298
[58] Field of Search ............ 248/562, 631, 161, 157, 248/566, 571, 575, 636, 188.3; 188/298; 267/33, 225, 219, 221, 121; 297/345

[56] References Cited

U.S. PATENT DOCUMENTS

| | | | |
|---|---|---|---|
| 2,856,035 | 10/1958 | Rohacs | 188/298 X |
| 3,121,479 | 2/1964 | Dillenburger et al. | 188/298 X |
| 3,752,270 | 8/1973 | Voildespino | 188/298 X |
| 4,614,255 | 9/1986 | Morita et al. | 188/298 X |

FOREIGN PATENT DOCUMENTS

| | | | |
|---|---|---|---|
| 3347274 | 7/1985 | Fed. Rep. of Germany | 248/562 |
| 62894 | 6/1955 | France | 188/298 |
| 671712 | 5/1952 | United Kingdom | 188/298 |

Primary Examiner—Alvin C. Chin-Shue

[57] ABSTRACT

A hydraulic automatically ascending apparatus includes a hydraulic cylinder including a piston and a piston rod which extends from the piston to connect with an article, a volume-variable oil tank, an elastometric body for biasing the oil tank to retract, an oil pipe for intercommunicating with the hydraulic cylinder and the oil tank, and a stop valve mounted in the oil pipe for being manually closed to stop oil flow between the hydraulic cylinder and the oil tank. When the stop valve is opened and when the article is loaded, the article can be descended and thus positioned at a desired position. When the stop valve is opened and when the article is unloaded, the article can be ascended to an upper limit position. A throttle valve is preferably installed within the oil pipe for slowing the movement of the piston rod.

7 Claims, 1 Drawing Sheet

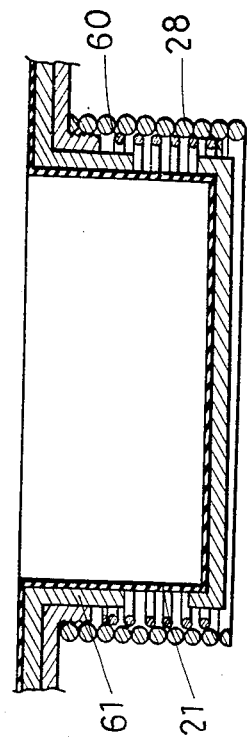
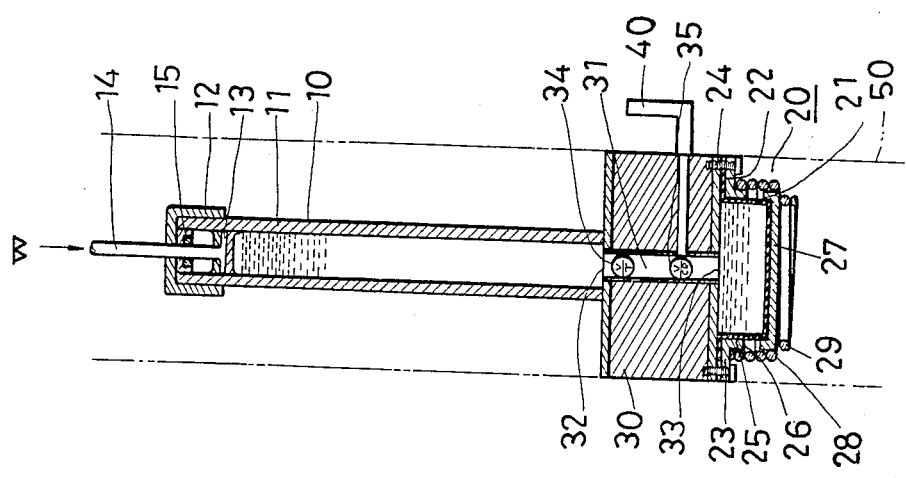
FIG. 2
FIG. 1

4,784,362

HYDRAULIC AUTOMATICALLY ASCENDING APPARATUS WITH A VOLUME-VARIABLE OIL TANK

BACKGROUND OF THE INVENTION

The present invention relates to a hydraulic automatically ascending apparatus, and more particularly to one which can automatically return an article to an upper limit position.

In recent years, computers have been widely used in offices. When a computer is used, the seat of the chair, on which the user sits, must be adjusted to an appropriate level corresponding to the height of the user and the position of the computer. Because the position of the computer may vary and the computer may be accessed by a number of users, it is often necessary to often adjust the height of the seat. Although several types of height-adjustable computer chairs have been developed, their structures are complicated. In addition, their seats must be ascended by manual adjustment.

SUMMARY OF THE INVENTION

It is therefore the main object of the present invention to provide a simple hydraulic automatically ascending apparatus which can position an article, the height of which is necessary to be adjusted, such as the seat of a chair, at a desired height when the article is loaded and which can automatically ascend the article to an upper limit position when the article is unloaded.

According to the present invention, the hydraulic automatically ascending apparatus includes a hydraulic cylinder having a piston and a piston rod which extends upwardly from the piston to connect with an article; an oil tank, being disposed below the hydraulic cylinder, which is made of a material capable of being deformed so that it has a variable volume, including an elastometric body mounted outwardly of the oil tank for biasing the oil tank to retract; and an oil passage means including an oil pipe for intercommunicating with the hydraulic cylinder and the oil tank, and a stop valve mounted in the oil pipe for being manually closed to stop oil flow between the hydraulic cylinder and the oil tank.

When the stop valve is opened and when the article is loaded, the article can be descended to a desired position while permitting the oil tank to extend. Then the article may be stopped by manually closing the stop valve so that the adjustment of the height is completed. Then the stop valve is opened and when the article is unloaded, the oil tank is retracted by the elastometric body so that oil will flow from the oil tank to the hydraulic cylinder, thereby returning the piston rod and hence the article to an upper limit position.

BRIEF DESCRIPTION OF THE DRAWINGS

Other features and advantages of the present invention will become apparent from the following detailed description of the preferred embodiments of the present invention with reference to the accompanying drawings in which:

FIG. 1 is a sectional view of a hydraulic automatically ascending apparatus according to the present invention; and FIG. 2 is a sectional view showing the lower portion of another hydraulic automatically ascending apparatus according to the present invention.

DETAILED DESCRIPTION OF THE PREFERRED EMBODIMENTS

Referring to FIG. 1, a hydraulic automatically ascending apparatus of the present invention has a hydraulic cylinder 10 which includes a cylinder body 11, a cover 12, a piston 13, a piston rod 14, and an oil seal 15. A load carrying article, e.g. the set of a height-adjustable chair (not shown), represented by a character W, is secured to the piston rod 14.

An oil tank means 20 includes a volume-variable oil tank 21 made of a rubber which can be deformed, such as polyurethane. The oil tank 21 is shaped like a circular barrel which has an open end and a closed end, and is formed with a first outward flange 22 which is pressed against a connecting block 30 by an abutting member 23. The abutting member 23 is screwed to the connecting block 30 by bolts 24. The first outward flange 22 of rubber is clamped tightly between the abutting member 23 and the connecting block 30 so that a liquid tight seal is established between the oil tank 21 and the abutting member 23. The abutting member 23 is formed with a circular downward flange 25 for receiving the open upper end of the oil tank 21. The downward flange 25 is formed with a small, second outward flange 26. A support 27 is formed with a circular upward flange for receiving the closed lower end of the oil tank 21. An elastometric body, which is a tension spring 28 in this embodiment, has at the lower end a diameter-reduced turn 29 which is retained on a diameter-reduced lower portion of the support 27. The upper end of the tension spring 28 is retained on the second outward flange 26 of the downward flange 25.

The connecting block 30 is provided with an internal oil pipe 31 which is intercommunicated at its two ends 32 and 33 with the hydraulic cylinder 10 and the oil tank 21. A throttle valve 34 is installed in the oil pipe 31 for regulating the oil flow from the hydraulic cylinder 10 to the oil tank 21. With the throttle valve 334, when the piston rod 14 is depressed, the oil will flow slowly from the hydraulic cylinder 10 to the oil tank 21. A stop valve 35 is installed in the oil pipe 31 and equipped with a control handle 40 so that it can be manually closed to stop the oil flow of hydraulic cylinder 10 and the oil tank 21.

In operation, if the hydraulic automatically ascending apparatus of the present invention is mounted within the support stem 50 of a computer chair seat, which is shown in the phantom lines, the piston rod 14 will be connected to the seat W. When no one is sitting on the seat W and when the stop valve 35 is opened, the tension force of the tension spring 28 will cause the oil tank 21 to retract so that the oil flows from the oil tank 21 to the hydraulic cylinder 10, thereby ascending the piston rod 14 to an upper limit position. When adjusting the height of the seat W, the stop valve 35 is first opened, then the user may sit on the seat W causing the seat W to descend slowly until reaching a desired position. The stop valve 35 is then closed to position the seat W at the desired position. It is understood that the oil tank 21 will extend when the piston rod 14 descends.

Referring to FIG. 2, to prevent any wall of the oil tank 21 from being clamped between two adjacent turns of the tension spring 28 when the oil tank 21 retracts, a spacing spring 60 is interposed between the oil tank 21 and the tension spring 28 and a protection ring 61 is interposed between the oil tank 21 and the spacing spring 60. The length of the spacing spring 60 is smaller than that of the tension spring 28.

With the present invention thus explained, it is apparent that various modifications and variations can be made without departing from the scope and spirit of the present invention. It is therefore intended that the present invention be limited only as indicated in the appended claims.

I claim:

1. A hydraulic automatically ascending apparatus comprising:
    a hydraulic cylinder including a piston, and a piston rod which extends upwardly from said piston to connect with an article,
    an oil tank, said tank being made of a material capable of being deformed so that it has a variable volume,
    an elastomeric body mounted outwardly of said tank for biasing said oil tank to retract,
    means for mounting said elastomeric body, and
    oil passage means including an oil pipe for intercommunicating with said hydraulic cylinder and said tank and connecting block measns between said hydraulic cylinder and said oil tank, said oil pipe being inserted through said connecting block means,
    said oil tank being shaped like a circular barrel having an open end and a closed end,
    said mounting means including (a) a first circular flange projecting from said connecting block, (b) means defining therein a first circular bore for receiving said open end of said oil tank, and (c) a support formed with a second circular flange projecting toward said first circular flange for defining therein a second circular bore for receiving said closed end of said oil tank,
    said elastomeric body comprising a tension spring interconnecting securely said first and second circular flanges for biasing said first circular flange to move toward said second circular flange while permitting said flanges always to be spaced from each other.

2. A hydraulic automatically ascending apparatus as claimed in claim 1, wherein said oil pipe includes a throttle valve mounted therein for regulating oil flow between said hydraulic cylinder and said oil tank.

3. A hydraulic automatically ascending apparatus as claimed in claim 1, wherein said oil pipe includes a stop valve mounted therein, said stop valve being capable of being manually closed to stop oil flow between said hydraulic cylinder and said oil tank.

4. A hydraulic automatically ascending apparatus as claimed in claim 1, wherein said oil tank is made of rubber.

5. A hydraulic automatically ascending apparatus as claimed in claim 4, wherein said oil tank is made of polyurethane.

6. A hydraulic automatically ascending apparatus as claimed in claim 1, wherein said oil tank is formed with an outward flange cooperative with said connecting block means for establishing a liquid tight seal between said oil tank and said connecting block means.

7. A hydraulic automatically ascending apparatus as claimed in claim 1, further comprising a spacing coil spring interposed between said oil tank and said tension spring, said spacing coil spring being of a length much smaller than that of said tension spring for preventing any wall of said oil tank from being clamped by any two adjacent turns of said tension spring when said oil tank is retracted.

* * * * *

UNITED STATES PATENT AND TRADEMARK OFFICE
CERTIFICATE OF CORRECTION

PATENT NO. : 4,784,362

DATED : November 15, 1988

INVENTOR(S) : John Wang

It is certified that error appears in the above-identified patent and that said Letters Patent is hereby corrected as shown below:

Column 1, Line 51, "Then" should be --When--;

Column 2, Line 40, "334" should be --34--;

In the Claims:

Column 3, Line 22, "measns" should be --means--.

Signed and Sealed this

Twenty-third Day of May, 1989

Attest:

DONALD J. QUIGG

Attesting Officer

Commissioner of Patents and Trademarks